United States Patent [19]

Miyauchi et al.

[11] 4,246,353

[45] Jan. 20, 1981

[54] MELT PROCESSING OF FLUORINATED POLYMERS

[75] Inventors: Hirotsugu Miyauchi, Tokyo; Hiroshi Sagami; Sakae Tsushima, both of Yokohama, all of Japan

[73] Assignee: Asahi Kasei Kabushiki Kaisha, Osaka, Japan

[21] Appl. No.: 40,537

[22] Filed: May 21, 1979

[30] Foreign Application Priority Data

May 30, 1978 [JP] Japan .................................. 53-63867

[51] Int. Cl.$^3$ ......................... C25B 13/00; C08D 5/20
[52] U.S. Cl. ...................................... 521/28; 204/296
[58] Field of Search ............................ 521/25, 30, 28; 204/296; 528/481, 499

[56] References Cited

U.S. PATENT DOCUMENTS

| | | | |
|---|---|---|---|
| 3,849,243 | 11/1974 | Grot | 521/27 |
| 3,852,135 | 12/1974 | Cook, Jr. | 204/296 |
| 3,884,885 | 5/1975 | Grot | 521/30 |
| 4,076,571 | 2/1978 | Specht et al. | 521/30 |
| 4,124,477 | 11/1978 | Tokawa et al. | 204/296 |

FOREIGN PATENT DOCUMENTS 2810018  9/1978  Fed. Rep. of Germany ............ 204/296

*Primary Examiner*—Joseph L. Schofer
*Assistant Examiner*—Peter F. Kulkosky
*Attorney, Agent, or Firm*—Birch, Stewart, Kolasch & Birch

[57] ABSTRACT

In performing melt processing of a fluorinated polymer which contains such pendant functional groups as sulfonic acid, carboxylic acid, sulfonamide and salts thereof, an aqueous medium is allowed to be present in the polymer to improve its melt-flow characteristic. Excellent heat sealing can be effected without degradation of the polymer. This method is particularly suitable for repairing the damaged ion-exchange membranes of fluorinated polymers used in the electrolysis of sodium chloride to enable elongation of their life to a great economical advantage.

8 Claims, No Drawings

MELT PROCESSING OF FLUORINATED POLYMERS

This invention relates to a method for melt processing of a fluorinated polymer having as its side chains at least one functional moiety selected from the group consisting of sulfonic acid, salts thereof, carboxylic acid, salts thereof, sulfonamide and salts thereof.

It is well known in the art to use a fluorinated polymer having such functional groups as sulfonic acid groups, carboxylic acid groups and sulfonamide groups as an ion-exchange membrane for separating an anode chamber from a cathode chamber in a chloro-alkali electrolytic cell. These ion-exchange membranes will frequently suffer from damages during usage such as tears, pin-holes or cracks. Such damages will occur as the result of bending of a membrane during assembling or disassembling of an electrolytic cell; as the result of stress concentration at portions at which the membrane is contacted with the packing portion or electrode during electrolysis; or otherwise as the result of the membrane being subjected to higher temperatures or severe atmospheres of generated gases, etc. The thus damaged membranes are lowered in electrolytic performance and therefore cannot be used again. It would be effective for lowering the cost in electrolysis, if such damaged membranes can be repaired for re-use to thereby elongate the life of expensive fluorocarbon type ion-exchange membranes.

As a method for repairing such a damaged membrane, it is known to bond a membrane of the same composition to the damaged portion. Due to the problems in heat-sealing of a fluorocarbon type ion-exchange membrane on account of its difficult melting characteristic, heat-sealing must be effected at a high temperature in the range from about 200° C. to about 370° C. By heat sealing at such a high temperature, it has been found that the bonded portions suffer from losses in elasticity and become embrittled.

For the purpose of eliminating such harmful embrittlement during heat sealing of the diaphragms, U.S. Pat. No. 4,076,571 (Specht et al) proposes a method for restoring elasticity to the heat sealed sections by contacting an aqueous fluid with the heat sealed sections of an electrolytic diaphragm. This method, while it may be effective for restoring elasticity to the heat sealed sections for a short time, for example, during installation of the diaphragm in an electrolytic cell, cannot give sufficient bonding strength to withstand electrolytic operation for a long time. This is because such a treatment with an aqueous fluid is applied only after the diaphragm is subjected to heat sealing at a high temperature, namely only after the diaphragm has suffered from substantial degradation during such heat sealing which cannot be repaired by the post-treatment. It is observed by the expert in the art:

"The polymers with the sulfonyl groups in the form of $-SO_3H$, salt thereof or salt of $-SO_2NH_2$ cannot be melt processed since there is degradation of the polymer at elevated temperature. These polymers are prepared from intermediate polymers which can be shaped and extruded at elevated temperature to form the polymer into the desired physical shape.", as is disclosed by U.S. Pat. No. 3,884,885 (Grot) at col. 2, lines 17 to 24. For overcoming this drawback, the same expert proposes in said Patent to convert the aforesaid form of sulfonyl groups to different forms by treatment with a tertiary amine, quaternary amine, quaternary ammonium base or the salt of the amine or base. This method, however, involves the following disadvantages:

(1) A complicated pre-treatment step is necessary for conversion of the functional groups to the salt form such as the amine prior to melt processing;

(2) When repairing is effected over a wide area of the membrane, it is required to restore the form of the functional groups to the original over a wide area;

(3) During the repairing step, there may occur shrinkage in the dimensions of the membrane, whereby it may become impossible to install the membrane in an electrolytic cell or the membrane may be expanded to cause generation of creases during electrolysis.

The present inventors have made extensive studies concerning the method for melt processing of the aforesaid polymer in order to overcome the drawbacks of the prior art. Unexpectedly, it has now been found that the polymer can be increased in melt-flow characteristic by heating in the presence of a sufficient amount of water and can be molten without degradation at an appropriate temperature. This phenomenon is entirely unexpected in the light of the prior art, because it is generally practiced in the art to sufficiently dry the polymer before melting in order to prevent foaming or other undesirable effects. Especially, in bonding membranes, water attached to the bonded surfaces has generally been expected by those skilled in the art to prevent said surfaces from being excellently bonded to each other. In view of this fact, it is surprising that the presence of water in an amount of as much as 5% or more does not interfere with adhesion between the surfaces to be bonded, but that an increase in the amount of water tends to further promote an increase in adhesion force in the resultant bonding.

According to the present invention, there is provided a method for melt processing of a fluorinated polymer which contains at least one pendant functional moiety selected from the group consisting of sulfonic acid, salts thereof, carboxylic acid, salts thereof, sulfonamide and salts thereof, which method comprises heating said polymer in the presence of an aqueous medium incorporated in said polymer prior to melt processing of said polymer.

In the present invention, the salt form of the functional groups possessed by the fluorinated polymer is used in the conventional meaning. That is, the salts of $-COOH$, $-SO_3H$ and $-SO_2NH_2$ are represented by $-COOX$, $-SO_3X$ and $-SO_2NHX$ (wherein X represents an alkali metal, an alkaline earth metal or $NH_4$), respectively. Typical examples of X are Na, K, Mg, Ca, etc. Among them, Na and K are preferred. But the group $-SO_2NHNH_4$ is not preferred since it is not stable.

The density of the functional groups in the polymer as represented in terms of equivalent weight (i.e. dry weight in grams of the polymer which contains one equivalent of the functional groups) may be in the range from 400 to 4000, preferably from 1000 to 1600 as a practical ion-exchange membrane.

The mode of distribution of the functional groups in the polymer is not particularly limited. For example, in case of ion-exchange membranes, there may be used such membranes in which two or more kinds of functional groups are distributed in layers, respectively.

The flourinated polymer to be used in the present invention can be prepared according to a conventional method by polymerizing one or more fluorinated ethylenes for the backbone polymer together with fluorinated vinyl compounds having functional groups as the side chain in the presence of a catalyst, using water or an organic solvent, as solvent followed by, if necessary, some modification treatment.

The fluorinated polymer having sulfonic acid groups as functional groups may be prepared by copolymerization of a fluorinated ethylene with fluorinated vinyl compound having sulfonic acid groups or groups convertible to sulfonic acid groups.

The fluorinated ethylene herein mentioned may be represented by the formula $CF_2=CXX'$ wherein X is H, F, Cl or $-CF_3$ and X' is the same as X or $CF_3(CF_2)_m$ (m is an integer of 1 to 5). Among them, $CF_2=CF_2$ is particularly preferred. The fluorinated vinyl compound having sulfonic acid groups or groups convertible thereto may be represented by the formula $CF_2=CFR_fSO_2F$ wherein $R_f$ is a bifunctional perfluorinated group having 2 to 8 carbon atoms which may either be branched or straight chain and may also have one or more ether bonds. As one example of such fluorinated vinyl compounds, there may be mentioned $CF_2=CF[OCF_2CF(CF_3)]_nOCF_2CF_2SO_2F$ (wherein n is an integer of 1 to 3, preferably n=1).

The fluorinated polymer having carboxylic acid groups as functional groups may be prepared by copolymerization of the fluorinated ethylene as represented by the formula set forth above and the fluorinated vinyl compound having carboxylic groups or groups convertible thereto. The fluorinated vinyl compound having carboxylic groups or groups convertible thereto may be exemplified by $CF_2=CFO(CF_2)_lCOOR$ and $CF_2=CFOCF_2CF(CF_3)O(CF_2)_mCOOR$, wherein R is an alkyl group having 1 to 10 carbon atoms, l and m are each an integer of 1 to 12, l being preferably 3 to 4 and m being preferably 1, 2 or 3. Typical examples of such fluorinated vinyl compounds are $CF_2=CFO(CF_2)_3COOCH_3$ and $CF_2=CFOCF_2CF(CF_3)O(CF_2)_3COOCH_3$.

The fluorinated polymer having sulfonic acid groups in the form of $-OCF_2CF_2SO_3M$ (wherein M is hydrogen, an alkali metal or ammonium ion) and carboxylic acid groups in the form of $-OCF_2COOM$ (wherein M is the same as defined above) may be prepared by saponifying a part of the groups $-OCF_2CF_2SO_2F$ of a polymer, prepared by copolymerization of fluorinated ethylene and a fluorinated vinyl compound having sulfonic acid groups or groups convertible thereto, with an aqueous alkali/methanol solution, then reacting the saponified product with phosphorus halide to convert said groups to the form of $-OCF_2CF_2SO_2Cl$, followed by treatment with a reducing agent to convert to the form of $-OCF_2COOH$ (see Japanese published unexamined patent applications No. 24176/1977 and No. 24177/1977).

The fluorinated polymer having sulfonic acid groups and sulfonamide groups may be prepared by contacting a copolymer of, for example, tetrafluoroethylene and perfluoro (3,6-dioxa-4-methyl-7-octenesulfonylfluoride) with an amine, followed by saponification treatment. This copolymer consists of two layers, one having as principal side chains the sulfonic acid groups ($-OCF_2CF_2SO_3M$) and the other the sulfonamide groups ($-OCF_2CF_2SO_2NHRNH_2$), wherein R is an alkyl group and M is the same as defined above.

The shape of the fluorinated polymer is not particularly limited in the present invention but may be membraneous (including two bonded films and a composite having embedded reinforcing material), granular, mass, powdery or of any other physical shape.

An ion-exchange membrane can be prepared by melt fabrication of a fluorinated polymer having such functional groups into the shape of a membrane, followed by saponification with an aqueous alkali/alcohol solution and further, if desired, by modification treatment or embedding of a reinforcing material as mentioned above.

As a preferred embodiment of the ion-exchange membrane, there may be mentioned a fluorocarbon type ion-exchange membrane comprising a layer having pendant sulfonic acid groups of which all or a part are of the form $-OCF_2CF_2SO_3M$ (hereinafter referred to as sulfonic acid layer) and a layer having pendant carboxylic acid groups of which all or a part are of the form $-OCF_2COOM$ (hereinafter referred to as carboxylic acid layer). The equivalent weight in this membrane each for the sulfonic acid layer and for the carboxylic acid layer may preferably be from 1000 to 1600. The equivalent weights for the sulfonic acid layer and for the carboxylic acid layer may either be the same or different. Even in the sulfonic acid layer, the equivalent weight is not required to be uniform. This type of membrane has generally a thickness of 50 to 500 microns, preferably 100 to 250 microns. The proportion of the carboxylic acid groups contained in the carboxylic layer in said membrane relative to the total ion-exchange groups may range from 10 to 100 mol %, preferably 40 to 100 mol %. The thickness of the carboxylic acid layer may sufficiently be at least 100 A, preferably 1.5 to 20 microns. Such an ion-exchange membrane having sulfonic acid groups and carboxylic acid groups can be prepared by treating an ion-exchange membrane having sulfonic acid groups with a halogenating agent to convert the sulfonic acid groups to sulfonylchloride groups, followed by treatment with a reducing agent to convert the sulfonylchloride groups to carboxylic acid groups, as is disclosed by Japanese published unexamined patent application No. 24177/1977.

The fluorinated polymers and membranes thereof as described above to be used in the present invention may be prepared according to the methods disclosed by, for example, U.S. Pat. Nos. 3,282,875 and 3,969,285; Japanese published unexamined patent application Nos. 92339/1975, 24176/1977, 24177/1977 and 28587/1977.

The amount of the aqueous medium necessary for melting of the polymer in the present invention is at least 5% by weight as water content based on the dry weight of the polymer. From the standpoint of application in repairing ion-exchange membranes, prevention of dimensional shrinkage as well as ease of handling, said amount is desirably at least 8%. The upper limit of the water content is not specifically limited, but a large amount of water droplets may be attached to the surface of the polymer. When membranes are to be sealed to each other, the presence of a considerably large amount of water droplets on the membrane surfaces will prevent the abutted surfaces from slipping off, thereby ensuring ease in handling, and the resultant adhesion force is rather improved. Moreover, even a pool of water on the membrane surface may also be feasible. Practically, a water content of about 50% or more may also suitably be used.

The aqueous medium to be used in the present invention may generally be water or an aqueous solution of salts, acids or alkalis. Alternatively, there may also be used an aqueous solution containing organic substances soluble in water such as alcohols, surfactants, etc.

The temperature at which the melting treatment is conducted may differ depending on the functional groups employed, the kinds of the salts employed or their densities, but may generally range from 150° to 350° C. For the purpose of repairing ion-exchange membranes, the temperature may preferably be from 200° to 300° C.

The melt processing of the present invention may be performed under pressurization, if desired. Especially, for repairing ion-exchange membranes, pressurization is effective and it is generally preferred to apply a pressure of 5 Kg/cm$^2$ to 30 Kg/cm$^2$. The heating time, which may suitably be selected depending on the temperature and the pressure employed, may generally range from 1 to 20 minutes, preferably from 2 to 10 minutes. When a hot press is used for repairing ion-exchange membranes, it is preferred to release the pressure after cooling the hot plate. That is, after heating the plate for a predetermined time under pressure, the hot plate is cooled under the same applied pressure by passing cooling water therethrough to a temperature lower by at least 80° C. than the heating temperature before releasing the pressure. Thus, dimensional shrinkage of the membrane can be prevented.

When damaged portions are to be repaired according to the method of the present invention, melt sealing occurs at the interface between the two hydrous membranes, whereby the leak can completely be prevented. In this case, it is desirable that the membrane to be put on the damaged portion (hereinafter referred to as patch membrane) have the same composition and the same water content as that on which the patch membrane is put. But by suitable selection of the melting conditions such as the temperature and the pressure, bonding can be effected even when there may be a difference in the functional groups employed, their densities or water contents between the membranes.

As apparently seen from the above detailed explanation of the present invention, the specific feature and the advantage of the present invention reside in that the fluorinated polymer having at least one pendant functional moiety selected from the group consisting of sulfonic acid group, carboxylic acid groups, sulfonamide groups and salts thereof, which are liable to degrade prior to melting, can be subjected to successful melt processing under heating without any specific pre-treatment only by permitting an aqueous medium to be present at the time of melting. This invention can be applied for repairing the ion-exchange membranes to effect melt sealing of a patch membrane on the damaged membrane after use in electrolysis in the wet state without any pre-treatment, whereby the repaired membrane suffers from no dimensional shrinkage. Absence of any specific pre-treatment on the membrane allows the repaired membrane to be directly put to re-use.

While the present invention has been described primarily with reference to repair of the ion-exchange membranes, the method of the present invention can be practiced for all melt processing irrespective of the shape of the fluorinated polymer having at least one pendant functional moiety selected from the group consisting of sulfonic acid groups, carboxylic acid groups, sulfonamide groups and salts thereof.

The present invention is explained in further detail by the following Examples, which are not limitative but illustrative of the present invention. All the percentages are by weight, unless otherwise noted.

EXAMPLE 1

A copolymer of tetrafluoroethylene with perfluoro (3,6-dioxa-4-methyl-7-octenesulfonylfluoride) having the density of functional groups in terms of equivalent weight of 1000 is treated with an aqueous solution comprising 15% of sodium hydroxide, 30% methanol and 55% water, and the functional groups are converted to —SO$_3$Na form.

After immersing this copolymer in water, there are prepared samples containing 2% and 30% of water, respectively. The melt-flow characteristics are measured for these samples according to the method of ASTM-D-1238 under a the conditions at 280° C. under load of 21.6 kg. The amount of flow for the sample with 2% water content is found to be zero, while that for the sample with 30% water content is 25 g/10 minutes.

The above test is repeated after immersing the polymer in the following mediums in place of water:
 (a) 0.5% NaOH aqueous solution
 (b) 0.2% aqueous HCl solution
 (c) 1% aqueous methanol solution The results of these tests are substantially the same as mentioned above.

EXAMPLE 2

As the ion-exchange membrane to be repaired, there is used a fluorocarbon type ion-exchange membrane comprising the laminated films each made of a copolymer of tetrafluoroethylene with perfluoro(3,6-dioxa-4-methyl-7-octenesulfonylfluoride), the first film having an equivalent weight of 1100 and thickness of 4 mil (about 100 microns) and the second film having an equivalent weight of 1500 and thickness of 2 mil (about 50 microns), said membrane being reinforced by embedding a net of polytetrafluoroethylene fibers on the side of the first film. This membrane has been used in electrolysis and has pin-holes formed thereon. The pendant ion-exchange groups are in the form of —SO$_3$Na, and the water content in the membrane is 20%.

As the patch membrane, there is used a film made of the same copolymer as in the membrane to be repaired, having an equivalent weight of 1100 and thickness of 5 mil (about 125 microns), in which reinforcing material is embedded. The patch membrane contained pendant ion-exchange groups in the form of —SO$_3$Na with a water content of 20%.

The side of the membrane to be repaired, in which reinforcing material is embedded, is contacted with the side opposite to the side of the patch membrane, in which reinforcing material is embedded, and subjected to a press at 280° C. under a pressure of 450 kg/30 cm$^2$ for 4 minutes.

The cross-section of the sealed surface is observed by microscope, whereby the melt sealing is found to be complete with the interface being indistinct. When immersed in boiling 50% aqueous methanol solution for 20% hours, the sealed portion is strong enough to undergo no peel-off.

EXAMPLES 3 to 5

Example 2 is repeated, but the kind of the salt of the functional groups in the ion-exchange membrane to be repaired is changed from Na to K, Ca, Mg, respectively, to give similar results.

EXAMPLE 6

A copolymer of tetrafluoroethylene with a perfluoro (3,6-dioxa-4-methyl-7-octenesulfonylfluoride) having an equivalent weight of 1600 is fabricated into a film with thickness of 250 micron and then treated with an aqueous solution comprising 10% sodium hydroxide, 40% methanol and 50% water. This film is taken out from water and, while it contains 50% of water, is folded into two sheets, followed by pressing at 280° C. under a pressure of 450 Kg/30 cm$^2$ for 5 minutes. The sealed face of the two films is indistinctive of its interface by microscopic observation and there occurs no peel-off after immersing in boiling water for 20 hours.

EXAMPLE 7

A copolymer of tetrafluoroethylene with $CF_2=CFO(CF_2)_3COOCH_3$ having an equivalent weight of 1200 is made into a film with a thickness of 250 microns and then saponified with an aqueous solution comprising 10% sodium hydroxide, 45% methanol and 45% water. After washing with water, two sheets of the films, each containing 20% of water, are superposed on one another and subjected to pressing press at 200° C. under a pressure of 300 Kg/30 cm$^2$ for 5 minutes. The two films are found to be firmly bonded without peel-off even after immersing in 50% aqueous methanol solution at 60° C. for 20 hours.

EXAMPLE 8

Under the same conditions as in Example 7 except for using $CF_2=CFOCF_2CF(CF_3)O(CF_2)_3COOCH_3$ in place of $CF_2=CFO(CF_2)_3COOCH_3$, there is prepared the film. Two sheets of the film, each containing 10% of water, are superposed on one another and subjected to pressing at 250° C. under a pressure of 150 Kg/30 cm$^2$ for 3 minutes. The cross-section of the sealed face is indistinctive of the interface by microscopic observation. After immersing the bonded film in 8 N aqueous sodium hydroxide solution at 90° C. for 10 days, there is found no peel-off.

EXAMPLE 9

A film of a copolymer of tetrafluoroethylene with perfluoro(3,6-dioxa-4-methyl-7-octenesulfonylfluoride) having an equivalant weight of 1100 and a thickness of 100 micron is laminated with a film of the same copolymer having an equivalent weight of 1500 and thickness of 50 micron, and a net of polytetrafluoroethylene is embedded as reinforcing material on the side of the film with an equivalent weight of 1100, followed by conversion into —$SO_3Na$ form, to provide a fluorinated ion-exchange membrane. This membrane is subjected to a modification treatment according to the following procedure.

After the membrane is returned to the H form with 1 N hydrochloric acid, it is converted to the sulfonylchloride form by reflux with heating at 120° C. for 20 hours using 1:1 phosphorus pentachloride/oxyphosphorouschloride mixture. After the reaction is over, the treated membrane is washed with carbon tetrachloride. Two sheets of this membrane are clamped between plastic frames using packing made of polytetrafluoroethylene. Into the frames is filled a 35% aqueous hypophosphorous acid solution, which is circulated with heating at 80° C. for 10 hours, followed by washing with water. Then, 47% aqueous hydrobromic acid is filled in the frames and circulated with heating at 80° C. for 20 hours to thereby effect the reaction only at the face with an equivalent weight of 1500 of the membranes.

The frames are disassembled to take out the two sheets of the membrane, which are in turn saponified with an aqueous solution comprising 10% sodium hydroxide, 45% methanol and 45% water. Subsequently, these membranes are oxidized in an aqueous solution comprising 2.5% sodium hypochlorite, 3.5% sodium hydroxide and 94% water at 75° C. for 20 hours, followed by washing with water, and further treated in a 0.5% aqueous hydroxide solution at 90° C. for 15 hours.

In the resultant membrane, the surface stratum with a thickness of 10 micron on the side with an equivalent weight of 1500 is found to be converted to the carboxylic acid groups —$OCF_2COONa$.

When this ion-exchange membrane is used for electrolysis of sodium chloride, there are formed pin-holes. These pin-holes are repaired according to the following method. On the side carrying carboxylic acid groups of pin-hole portions with a water content of 20%, there are superposed patch membranes with a water content of 30% made of a copolymer of tetrafluoroethylene with perfluoro(3,6-dioxa-4-methyl-7-octenesulfonylfluoride) having an equivalent weight of 1100 and a thickness of 250 microns (in the form of —$SO_3Na$). Heat sealing is effected by means of pressing at 250° C. under a pressure of 300 Kg/30 cm$^2$ for 5 minutes.

This membrane is found to be free from dimensional shrinkage and, when provided for re-use in electrolysis, there is observed no lowering in electrolytic performance. When the membrane is observed after running for 200 days, there is found neither a generated crease nor peel-off of the patch membranes.

EXAMPLE 10

Two sheets of the membrane obtained by modification treatment in the same manner as in Example 9, each containing 10% of water, are juxtaposed with the sides having carboxylic acid groups being innerside and subjected to a press at 230° C. under a pressure of 150 Kg/30 cm$^2$ for 5 minutes. When this melt sealed membrane is immersed in 8 N aqueous sodium hydroxide solution at 90° C. for 100 days, there occurs no peel-off.

EXAMPLE 11

Two films of a copolymer of tetrafluoroethylene with perfluoro(3,6-dioxa-4-methyl-7-octenesulfonylfluoride) each having an equivalent weight of 1150 and thickness of 200 microns are assembled in a plastic frame. Into the frame is filled 99% ethylenediamine so as to be contacted with one surface of each film. After 5 minutes, ethylenediamine is drawn out to be replaced with dilute acetic acid for washing, followed by washing with water. After the films are taken out from the frame, residual sulfonyl groups are saponified with an aqueous solution comprising 10% sodium hydroxide, 45% methanol and 45% water.

The two films, each containing 10% of water, are subjected to pressing with the surfaces treated with ethylenediamine being innerside at 220° C. under a pressure of 150 Kg/30 cm$^2$ for 5 minutes. The two films are firmly bonded to each other and no peel-off is found after immersion in 50% methanol at 60° for 20 hours.

EXAMPLE 12

Examples 2, 7, 9 and 11 are repeated, respectively, by using various aqueous mediums for giving the required water content. The results are substantially the same for water, 0.5% aqueous NaOH solution, 0.8% aqueous methanol solution, 0.2% aqueous HCl solution, 0.5% aqueous formalin solution and 0.2% aqueous KOH solution.

EXAMPLE 13

This Example shows the critical water content to be contained in the fluorinated polymer at the time of heat sealing. Using the same membrane (—SO$_3$Na form) and the same procedure as described in Example 2, but at various levels of water content after immersing both the membrane to be repaired and the patch membrane in water overnight, peel-off tests are conducted for various samples shown in Table 1. The results of the tests are also shown in the same Table.

TABLE 1

| Sample No. | Remarks | Water content (wt. %) | Adhesion* |
|---|---|---|---|
| 1 | Many water droplets are adhered on the surface. | about 30 | Good |
| 2 | The surface is wiped with filter paper. | 17 | Good |
| 3 | The membranes are left to stand at 15° C. (relative humidity of 60%) for 15 minutes: | 8.5 | Good |
| 4 | The membranes are left to stand at 15° C. (relative humidity of 60%) for 30 minutes | 5.3 | Passable |
| 5 | The membranes are left stand at 15° C. (relative humidity of 60%) for 60 minutes | 3.0 | Bad |
| 6 | The membranes are left to stand at 15° C. (relative humidity of 60%) for 180 minutes | 1.8 | Bad |

(Note)
Melt conditions: 280° C., 15 Kg/cm$^2$, 4 minutes
*Good = No peel-off at the interface
Passable = Partial peel-off at the interface
Bad = Peel-off at the interface Using each of the above samples which is assembled in a filter-press type electrolytic cell, electrolysis of aqueous sodium chloride is carried out at 90° C., at a current density of 40 A/dm$^2$, with the anolyte being 2.7 N sodium chloride and catholyte being 20% sodium hydroxide. After 100 hours, as the result, in case of samples No. 5 and No. 6, partial peel-off is found to occur at the repaired portion, while in the case of the other samples, there is observed nothing abnormal.

As apparently seen from the above results, there can be obtained only insufficient heat sealing when water is not present in an amount sufficient to improve the melt-flow characteristic of the fluorinated polymer at the time of melting thereof.

EXAMPLE 14

A cation-exchange membrane of the same type as used in Example 2 with the size of 120 cm×240 cm is provided for use in electrolysis of an aqueous sodium chloride solution. After the electrolysis, pin-holes are observed at 10 positions on the membrane.

This membrane is disassembled from the electrolytic cell and, after dipping in a water bath, subjected to repairing. The ion-exchange groups contained in the membrane are of the form-SO$_3$Na with a water content of 20%. As the patch membrane, there is used a film made of the same copolymer as that used for the membrane to be repaired, having an equivalent weight of 1100 and a thickness of 125 microns and being reinforced with a reinforcing material embedded therein. The patch membrane contains ion-exchange groups of the form —SO$_3$Na with a water content of 20%.

At the pin-hole positions on the membrane to be repaired, there are placed the patch membranes with a diameter of about 30 mm and melt sealing is effected according to the same procedure as in Example 2. The thus repaired membrane is found to be free from dimensional shrinkage as compared with the membrane before repairing.

Then, the repaired membrane is provided for use in electrolysis of an aqueous sodium chloride solution again for 180 days, whereby there is observed no lowering in electrolytic performance, without peel-off of the patch membrane.

We claim:

1. A method for melt processing of a fluorinated vinyl polymer which contains at least one pendant functional moiety selected from the group consisting of sulfonic acid groups, carboxylic acid groups, sulfonamide groups and salts thereof, which comprises heating said polymer in the presence of an aqueous medium incorporated in said polymer prior to melt processing of the polymer.

2. The method according of claim 1 wherein the fluorinated vinyl polymer is in the form of a membrane.

3. The method according to claim 2 wherein the fluorinated vinyl polymer is an ion-exchange membrane prepared from a copolymer of CF$_2$=CF$_2$ and CF$_2$=CF[OCF$_2$CF(CF$_3$)]$_n$OCF$_2$CF$_2$SO$_2$F wherein n is an integer of 1 to 3.

4. The method according to claim 2 wherein the fluorinated vinyl polymer is an ion-exchange membrane prepared from a copolymer of CF$_2$=CF$_2$ and CF$_2$=CFO(CF$_2$)$_l$COOCH$_3$ wherein l is an integer of 3 or 4 or CF$_2$=CFOCF$_2$CF(CF$_3$)O(CF$_2$)$_m$COOCH wherein m is an integer of 1 to 3.

5. The method according to claim 2 wherein the fluorinated vinyl polymer is an ion-exchange membrane having pendant sulfonic acid groups and carboxylic acid groups, said pendant sulfonic acid groups being at least in part in the form of —OCF$_2$CF$_2$SO$_3$M wherein M represents hydrogen, an alkali metal or ammonium and said pendant carboxylic acid groups being at least in part in the form of —OCF$_2$COOM wherein M is the same as defined above.

6. The method according to any of claims 1 to 5 wherein the aqueous medium includes water in an amount of 8 wt.% or more based on the dry weight of the polymer.

7. The method according to any of claims 1 to 5 wherein the heating temperature is in the range from 200° to 300° C.

8. The method according to any of claims 1 to 5 wherein the heating is performed under a pressure in the range from 5 to 30 Kg/cm$^2$.

* * * * *

UNITED STATES PATENT AND TRADEMARK OFFICE
CERTIFICATE OF CORRECTION

PATENT NO. : 4,246,353
DATED : January 20, 1981
INVENTOR(S) : Miyauchi et al

It is certified that error appears in the above—identified patent and that said Letters Patent is hereby corrected as shown below:

In the heading entitled "[73] Assignee",

Change "Asahi Kasei Kabushiki Kaisha" to

--Asahi Kasei Kogyo Kabushiki Kaisha--.

Signed and Sealed this

Twelfth Day of May 1981

[SEAL]

*Attest:*

RENE D. TEGTMEYER

*Attesting Officer*     *Acting Commissioner of Patents and Trademarks*